United States Patent
Song et al.

(10) Patent No.: US 12,314,206 B2
(45) Date of Patent: May 27, 2025

(54) HOT-PLUGGING EDGE COMPUTING TERMINAL HARDWARE ARCHITECTURE AND SYSTEM

(71) Applicant: Shanghai Makesens Energy Storage Technology Co., Ltd., Shanghai (CN)

(72) Inventors: Pei Song, Shanghai (CN); Jian Zhao, Shanghai (CN); Guopeng Zhou, Shanghai (CN); Xiao Yan, Shanghai (CN); Enhai Zhao, Shanghai (CN)

(73) Assignee: Shanghai Makesens Energy Storage Technology Co., Ltd., Shanghai (CN)

( * ) Notice: Subject to any disclaimer, the term of this patent is extended or adjusted under 35 U.S.C. 154(b) by 23 days.

(21) Appl. No.: 18/238,537

(22) Filed: Aug. 28, 2023

(65) Prior Publication Data
US 2024/0070104 A1    Feb. 29, 2024

(30) Foreign Application Priority Data
Aug. 26, 2022  (CN) .......................... 202211033700.1

(51) Int. Cl.
*G06F 13/40*   (2006.01)
*G06F 9/445*   (2018.01)
*G06F 9/48*    (2006.01)

(52) U.S. Cl.
CPC ...... *G06F 13/4081* (2013.01); *G06F 9/44526* (2013.01); *G06F 9/4881* (2013.01)

(58) Field of Classification Search
CPC . G06F 13/4081; G06F 9/4881; G06F 9/44526
USPC .......................................................... 710/302
See application file for complete search history.

(56) References Cited

U.S. PATENT DOCUMENTS

| | | | | |
|---|---|---|---|---|
| 10,069,707 | B2* | 9/2018 | Brady | H04L 43/0888 |
| 2013/0325985 | A1* | 12/2013 | Brady | H04L 67/1034 |
| | | | | 709/206 |
| 2018/0316759 | A1* | 11/2018 | Shen | H04L 67/51 |
| 2021/0373951 | A1* | 12/2021 | Malladi | G06F 9/5016 |
| 2023/0195751 | A1* | 6/2023 | Sun | G06F 16/273 |
| | | | | 707/615 |
| 2024/0020174 | A1* | 1/2024 | Han | G06F 9/5044 |

* cited by examiner

*Primary Examiner* — Brian T Misiura
(74) *Attorney, Agent, or Firm* — IPRTOP LLC

(57) ABSTRACT

A hot-plugging edge computing system includes at least an elastic database, a data processing module, and hot-plugging computing modules. The elastic database is configured to store data through an SSD array with a configurable number of SSDs. The data processing module is connected to the elastic database and each of the hot-plugging computing modules, and controls data storage in the elastic database, monitors and assigns a task to each of the hot-plugging computing modules. Each of the hot-plugging computing modules performs data computing based on the corresponding task assigned by the data processing module, and returns a computing result to the corresponding data processing module.

9 Claims, 2 Drawing Sheets

HOT-PLUGGING EDGE COMPUTING TERMINAL HARDWARE ARCHITECTURE AND SYSTEM

CROSS REFERENCE TO RELATED APPLICATION

The present application claims the benefit of priority to Chinese Patent Application No. CN 202211033700.1, entitled "HOT-PLUGGING EDGE COMPUTING TERMINAL ARCHITECTURE AND SYSTEM", filed with CNIPA on Aug. 26, 2022, the disclosure of which is incorporated herein by reference in its entirety for all purposes.

FIELD OF INVENTION

The present disclosure relates to the technical field of energy storage, and in particular, to devices of energy storage power stations.

BACKGROUND OF THE INVENTION

Constructed within the context of the energy "internet", comprehensive energy power stations represent an expansion of traditional distributed energy power stations. By harnessing the combined advantages of resources such as wind, solar, hydro, coal, and natural gas from large-scale comprehensive energy bases, this type of power stations promotes systems that utilize multiple forms of energy. Utilizing advanced information and communication technologies, as well as the Internet of Things, the stations connect distributed energy power stations and end users with their various energy needs. Surplus energy is stored in the cloud and can be freely converted between various forms of energy using equipment such as electric-to-gas convertors, electric boilers, and electric refrigeration machines.

To realize sharing and coordinating control of multiple forms of energy, it is necessary to understand system prediction and resource operation prediction, control coordination, and transaction strategy optimization under a distributed multi-energy coupling control system, all of which demands computational power.

SUMMARY

The present disclosure provides a hot-plugging edge computing system, comprising at least an elastic database, a data processing module, and hot-plugging computing modules. The elastic database comprises a solid-state drive (SSD) array with a configurable number of SSDs and a sufficient database capacity. The elastic database stores data through the SSDs which comprise a configurable number of SSDs. The data processing module comprises a connecting port to connect to the elastic database and terminal followed multiple connecting ports to the hot-plugging computing modules, the data processing module controls data storage in the elastic database, and monitors and assigns a task to each of the hot-plugging computing modules. Each of the hot-plugging computing modules performs data computing based on the corresponding task assigned by the data processing module, and returns a computing result to the data processing module.

Optionally, the hot-plugging edge computing system further comprises a switch connecting between the data processing module and the hot-plugging computing modules, wherein the switch comprises a plurality of access ports connected to the hot-plugging computing modules.

Optionally, the hot-plugging edge computing system further comprises an interface module connected to the data processing module, wherein the interface module comprises at least two types of communication interfaces, and wherein the at least two types of communication interfaces connect external devices to the data processing module.

Optionally, the data processing module comprises: a monitoring unit comprising a connecting port to periodically receive status information from the hot-plugging computing modules via the connection port; and a task assignment unit, comprising a connecting port to connect to the monitoring unit, wherein the task assignment unit assigns a task to one of the hot-plugging computing modules via the connecting port based on the status information and task data attributes of the hot-plugging computing module.

Optionally, the task data attributes comprise a task type, a task data type, and a data processing throughput.

Optionally, the data processing module further comprises a data transmission unit, comprising an algorithm unit or a demand solving unit, and connection ports to connect to each of the hot-plugging computing modules; wherein the data transmission unit is requested by one of the hot-plugging computing modules to perform data computing, and then the data transmission unit transmits the computed data from the algorithm unit or the demand solving unit to the hot-plugging computing module based on the task data attributes.

Optionally, the data processing module further comprises: a data acquisition and processing unit, comprising a connection port to receive acquired data from a data collection terminal, wherein the data acquisition and processing unit encrypts and stores the received data into the elastic database; and a data uploading unit, comprising connection ports to connect to each of the hot-plugging computing modules, wherein the data uploading unit stores the computing result returned by each of the hot-plugging computing modules into the elastic database or upload the computing result to a cloud server.

Optionally, each of the hot-plugging computing modules comprises an Advanced RISC Machine (ARM) processor, a reduced instruction set computer (RISC-V) processor, or a Field Programmable Gate Arrays (FPGA), and the data processing module comprises a data processing unit.

Optionally, each of the hot-plugging computing modules comprises the Shell software architecture with its underlying driver separated from its application layer, to realize parallel computing of the hot-plugging computing modules.

Optionally, the hot-plugging computing modules have differentiated configurations.

In summary, the hot-plugging edge computing system of the present disclosure has the following beneficial effects.
1. The present disclosed system can realize rapid analysis of multi-station cooperation of comprehensive energy stations, and utilize a model-free distributed data processing architecture to flexibly address data calculation and processing requirements across various scenarios.
2. The present disclosed system achieves a hot-plugging edge computing terminal which has a low power consumption and a high computing power, thereby enabling on-site edge computing within the comprehensive energy power stations. This feature facilitates the rapid transmission and calculation of energy terminal data, so it provides a foundation for the efficient management and control of multi-energy networks.

REFERENCE NUMERALS

Figure 1:
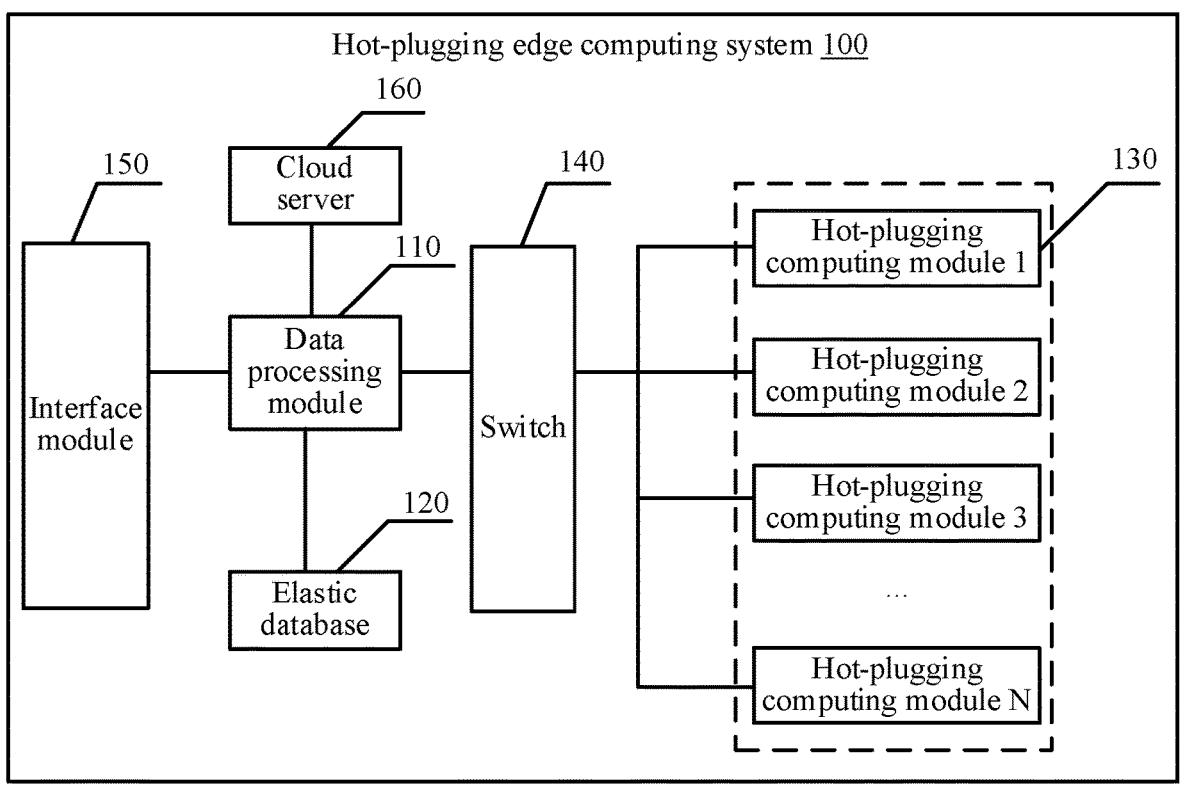
FIG. 1 is a schematic block diagram of a hot-plugging edge computing system according to an embodiment of the present disclosure.

100 Hot-plugging edge computing system
110 Data processing module
111 Monitoring unit
112 Task assignment unit
113 Data transmission unit
114 Data acquisition and processing unit
115 Data uploading unit
120 Elastic database
130 Hot-plugging computing module
140 Switch
150 Interface module
160 Cloud server
200 Data collection terminal followed terminal

DETAILED DESCRIPTION

Implementations of the present disclosure are described below through specific examples, and a person skilled in the art can easily understand other advantages and effects of the present disclosure from the contents disclosed in this specification. The present disclosure may further be implemented or applied through other different specific implementations, and various details in this specification may also be modified or changed based on different viewpoints and applications without departing from the spirit of the present disclosure.

The present disclosure provides a hot-plugging edge computing system, which realizes fast transmission and computing of energy terminal data and flexibly address data calculation and processing requirements across various scenarios.

The principle and implementation of the hot-plugging edge computing system of the present disclosure are to be described in detail below, so that a person skilled in the art can understand the hot-plugging edge computing system of the present disclosure without creative efforts.

As shown in FIG. 1, the hot-plugging edge computing system 100 comprises an elastic database 120, a data processing module 110, and hot-plugging computing modules 130.

Optionally, the elastic database 120 comprises a solid-state drive (SSD) array with a configurable number of SSDs through which to store data with a configurable capacity. The elastic database 120 may be applied in various scenarios by having a scalable database array.

The hardware components of the elastic database 120 are the SSDs in the array. The response speed and power consumption of the SSDs are far superior to the traditional mechanical hard disks, and SSDs have ultra-high real-timeness and ultra-low power consumption.

The elastic database is elastic (flexible) as to the number of SSDs (i.e., database capacity) of the database may be configured according to the actual needs of the comprehensive energy station. When necessary, the number of SSDs may be increased or decreased at any time, the array may be adjusted, and the storage capacity may be revised.

The data processing module 110 is connected to the elastic database 120 and each of the hot-plugging computing modules 130, and is configured to control data storage in the elastic database 120, and monitor and assign a task to each of the hot-plugging computing modules 130.

Optionally, for the elastic scalable elastic database 120, the data processing module 110 comprises a data processing unit to process the data from the elastic database 120.

Figure 2:
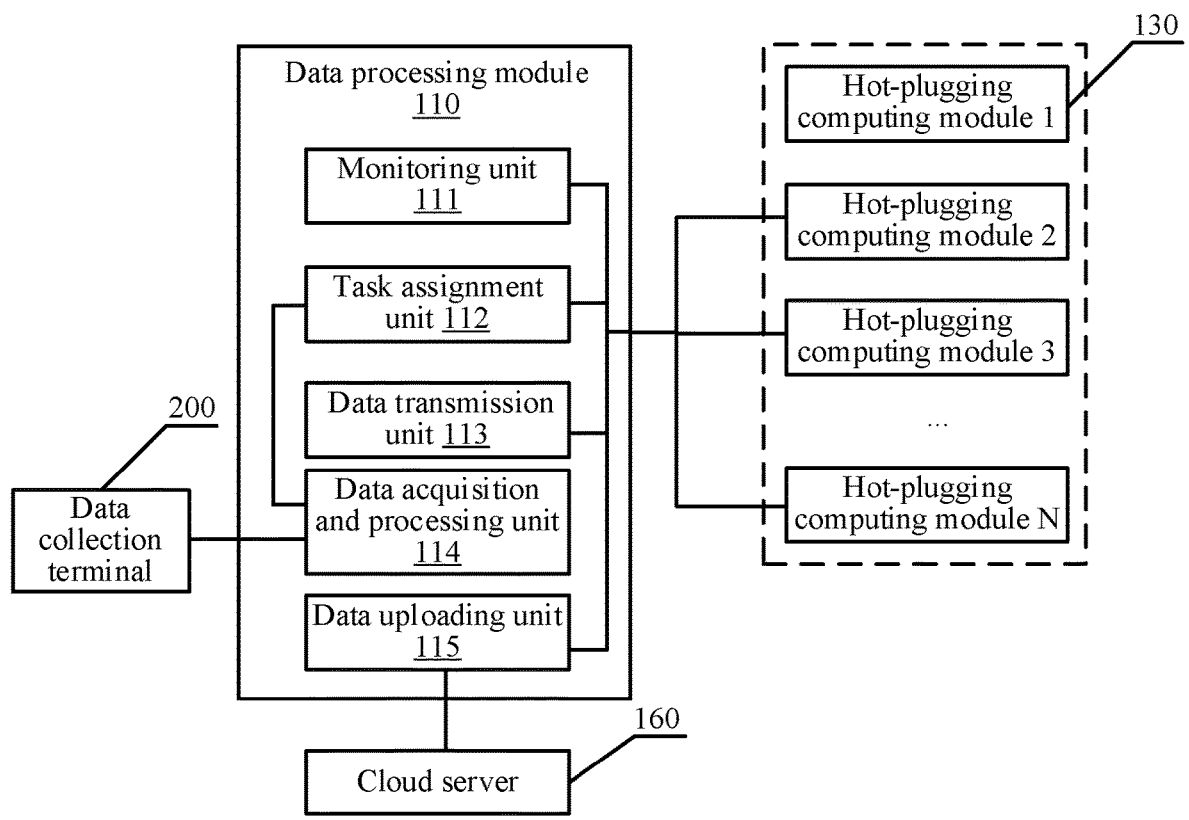
FIG. 2 is a schematic block diagram of a data processing module in a hot-plugging edge computing system according to an embodiment of the present disclosure.

Specifically, in one example as shown in FIG. 2, the data processing module 110 comprises a monitoring unit 111, a task assignment unit 112, a data transmission unit 113, a data acquisition and processing unit 114, and a data uploading unit 115.

Optionally, the monitoring unit 111, comprising connection ports to the hot-plugging computing modules, periodically receives status information from the hot-plugging computing modules 130. Each active hot-plugging computing module periodically sends its own status information to the monitoring unit 111 through the connection ports, wherein the status information may comprise configuration information, running task status, and the like.

Optionally, the task assignment unit 112, comprising connection ports to the monitoring unit 111 and the hot-plugging computing modules 130, is configured to assign a task to each of the hot-plugging computing modules 130 based on the status information and task data attributes of the corresponding hot-plugging computing module 130.

The task data attributes comprise a task type, a task data type, and/or a data processing throughput.

Optionally, the cloud server 160 sends computing tasks to the task assignment unit 112, and the task assignment unit 112 assign the received computing tasks to different hot-plugging computing modules 130.

Different from the load balancing strategy traditionally applied to distributed servers, the hot-plugging computing modules 130 of the present disclosure have differentiated configurations. That is, the hot-plugging computing modules 130 on site may be configured differently according to different computing tasks or cost considerations. Therefore, during task assignment, the task assignment unit 112 needs to take into account hardware attributes of the hot-plugging computing modules 130, and key attributes of the computing tasks such as task data property and data processing throughput, before assigning the computing tasks to appropriate computing units, thereby improving computing efficiency and effectively utilizing computing resources.

The task data attributes are determined by the data uploaded by transducers applied to different energy source scenarios, for example, a rotational speed of blades in a wind energy system, a battery's voltage and temperature in an electrochemical energy storage system. The task data attributes do not necessarily have a uniform order of magnitude or precision.

The data processing throughput is determined by the speed of data processing and the frequency and volume of data collected by the task itself. This is reflected in the total capacity of data processing, which is divided into three levels: KB (kilobyte), MB (megabyte), and GB (gigabyte). For different data volumes, the requirements for the main frequency, memory, or cache capacity of the processor in the hot-plugging computing modules 130 are different, and therefore it is necessary to select the most suitable hot-plugging computing module 130 in a targeted manner to process the assigned computing tasks. Optionally, the task assignment unit 112 adopts an assignment model for task assignment, and as an example, the operation principle of the assignment model is specifically implemented as follows:

1. Each computing task delivered by the cloud server is represented by a series of identification codes in the format of Key: Value, wherein Key is the keyword(s) of an attribute of the task, and Value is the corresponding numerical indication value of the attribute. Generally, main attributes of a task comprise:
1) Computing priority, with Value being an integer ranging from 1 to 9, wherein a smaller value indicates a higher priority level.
2) Application scenario, with Value being an integer ranging from 1 to 99, which may be increased or decreased in practice. For example, 1 represents a wind turbine generator set in a comprehensive energy station.
3) Computing service, with Value being an integer ranging from 1 to 65536, which may be increased or decreased in practice. For example, 1 represents calculating the daily power generation efficiency of the wind turbine generator set.
4) Target computing period, with Value being the format of [Start time: Year-Month-Day Hour: Minute: Second] and [End time: Year-Month-Day Hour: Minute: Second], for example, [Start time: 2022-01-01 00:00:00] and [End time: 2022-01-01 00:00:00]. Combining the above 1, 2, and 3, an exemplary task delivered by the cloud might be: calculating a daily power generation efficiency of a wind turbine generator set from 00:00:00 of Jan. 1, 2022 to 00:00:00 of Feb. 1, 2022.

2. For hot-plugging computing modules having different hardware configurations, attribute IDs are assigned, and the format of the ID may be: Platform-Resource grade. Platform represents the type of the computing platform (i.e., one of the hot-plugging computing modules), which is generally determined according to kernel attributes of the computing platform, and may be one of A, R, F, ZA, and ZR, wherein A represents an ARM processor, R represents an RISC-V processor, F represents an FPGA core, ZA represents FPGA+ARM, and ZR represents FPGA+RISC-V. Resource grade ranges from 0 to 30, with a smaller value indicating a lower core clock speed and fewer memory resources.

3. Attribute IDs are also assigned to computing task algorithm modules stored in the elastic database, with the format of Platform-Resource grade, which is the same as that of the hot-plugging computing modules. With matching platform attributes, a computing platform offering a higher resource grade is compatible with an algorithm module requiring a lower resource grade.

Based on the above three points, after receiving a computing task, the data processing unit first requests a corresponding task-algorithm-module support list from the elastic database based on the application scenario and the computing task indicated by a task identification code, selects a compatible hot-plugging computing module from the support list based on Platform-Resource grade attributes displayed in the list, and determines, based on status information uploaded by the hot-plugging computing module, whether to deliver an algorithm module to the hot-plugging computing module. In addition, the following three special cases frequently occur during task assignment.

1) If a plurality of hardware platforms supports a task, that is, a corresponding algorithm module is developed for different hardware platforms, then the data processing unit needs to further perform matching according to the priority of the computing task. The principle is that a computing task with a higher priority is preferentially assigned a hot-plugging computing module with a higher resource grade, or a computing task with a longer target computing period is assigned a hot-plugging computing module with a higher resource grade, so as to realize parallel distributed computing of tasks.

2) For a task, if no corresponding available algorithm module exists in the local elastic database, then the data processing unit requests an algorithm module providing corresponding service from the cloud, and if the request succeeds, the requested algorithm module is assigned to a corresponding hot-plugging computing module.

3) For a task (i.e., a new task), if the hot-plugging computing module assigned to it is executing another task (i.e., a current task), when the data processing unit determines that the following two conditions are satisfied at this time, the data processing unit instructs the hot-plugging computing module to suspend the current task and execute the new task:
Condition 1: The priority of the new task is at least 3 levels higher than that of the current task.
Condition 2: The execution progress of the current task is less than 90% complete.

Optionally, the data transmission unit 113 comprises an algorithm unit or a demand solving unit and connection ports to the hot-plugging computing modules 130. The data transmission unit 113 is requested by each of the hot-plugging computing modules 130 to perform data computing, and then transmit computed data from the algorithm unit or the demand solving unit to the corresponding hot-plugging computing module 130 based on the task data attributes.

That is, the data processing unit may assign the algorithm unit or demand solving unit based on different tasks and download the algorithm unit or demand solving unit to the requesting corresponding hot-plugging computing module 130. The algorithm unit or the demand solving unit has matching IDs. The algorithm unit or the demand solving unit may be stored in the elastic database 120, and the data processing unit may also download data of the algorithm unit or the demand solving unit from the cloud service request to the local elastic database 120.

Optionally, the data acquisition and processing unit 114 comprises connection ports to a data collection terminal 200, from which it receives collected data from a collection terminal followed by encrypting and storing the received acquired data into the elastic database 120. The data uploading unit 115 comprises a connecting port to the hot-plugging computing modules 130, it stores the computing result returned by each of the hot-plugging computing modules 130 into the elastic database 120 or upload the computing result to a cloud server 160.

That is, the data processing module 110 is capable of managing the uplink and downlink throughput of data in the elastic database 120.

For data uplink, the data processing unit encrypts different data information acquired by the data collection terminal followed terminal 200 according to device categories, and stores the encrypted data information into the elastic database 120.

For data downlink, data to be processed is transmitted to different hot-plugging computing modules 130 through a switch 140 (dedicated bus), and then results uploaded by the hot-plugging computing modules 130 are also stored in the elastic database 120 or uploaded to the cloud server 160 according to the device categories.

It can be seen from the above that the data processing module 110 (including the data processing unit) will take over the role of a CPU as the primary gateway for the elastic database 120. It works in conjunction with network interfaces such as 4G/5G and ethernet, as well as upper-level computers or the cloud server 160 to facilitate data communication. Additionally, it acts as a data gateway between the lower-level computer and the elastic database 120, allowing for high-speed storage and retrieval of data processed by the lower-level computer (i.e., the data collection terminal 200).

Furthermore, when communicating with the cloud server or the upper-level computers, the data processing unit will be responsible for data encryption and decryption. In a network environment, maintaining the confidentiality of data is crucial. Encryption and decryption algorithms, such as the SM2 asymmetric encryption algorithm, SM3 hash algorithm, and SM4 symmetric block cipher algorithm of the national secret standard, have significant overhead. As blockchain-based businesses mature, running consensus algorithms like POW and verifying signatures will consume a considerable amount of CPU computing power. However, these algorithms can be implemented by integrating them into the data processing unit of the present disclosure.

Optionally, each of the hot-plugging computing modules 130 performs data computing based on the task assigned by the data processing module 110, and return a computing result to the data processing module 110.

"Hot-plugging" is a type of fast connection that when the hot-plugging edge computing system 100 is connected to another hot-plugging computing modules 130, the hot-plugging edge computing system 100 does not need to be powered off or stop its current tasks. To operate properly, first, in terms of physical connection, a hardware communication interface of each of the hot-plugging computing modules 130 needs to be compatible with the communication interface provided by a dedicated bus, such as a high-speed ethernet interface or a high-speed serial communication bus; and second, in terms of software, the industry-standard Modbus communication protocol is applied, which defines the specific addresses of the master and slave devices, as well as the format of the transmitted data. This enables data exchange and transmission between upstream and downstream at the application level. Hot-plugging is realized through combination of the physical connection and the software.

The data processing unit (including the data processing unit), combined with the elastic database 120, cooperates with the hot-plugging computing modules 130 with different computing power, flexibly configures the operation algorithm according to different application scenarios, flexibly adapts to energy stations with different computing scales, realizes rapid analysis of multi-station cooperation of comprehensive energy stations, and utilize a model-free distributed data processing architecture to flexibly address data calculation and processing requirements across various scenarios. In addition, the hot-plugging computing modules 130 achieve hot-plugging with low power consumption, and high computing power, enabling on-site edge computing within comprehensive energy power stations.

The dedicated bus is a key node unit for data input and output of the hot-plugging computing modules 130. Optionally, the dedicated bus is realized by a switch 140, such as a fast Ethernet switch 140 or an optical fiber switch 140, and serves to realize point-to-point and collision-free rapid data transmission between two devices. Also, according to different locations of the bus, the dedicated bus may be configured with a one-to-many communication architecture or a many-to-one communication architecture. In an example as shown in the figures, the dedicated bus is configured with a many-to-one communication architecture; that is, the bus has a plurality of device import interfaces connected to the hot-plugging computing modules 130 with corresponding interfaces, and one device export interface connected to the data processing unit. The import interfaces and the export interface are full-duplex interfaces.

Specifically, the hot-plugging edge computing system further comprises a switch 140 connected between the data processing module 110 and the hot-plugging computing modules 130. The switch 140 is provided with a plurality of access connecting ports to the hot-plugging computing modules 130. That is, the hot-plugging computing modules 130 realize hot-plugging through the access connecting port provided by the switch 140.

According to the scale and demand of the comprehensive energy station and budget limitations, the hot-plugging edge computing system 100 is equipped with different numbers of hot-plugging computing modules 130 having different hardware configurations. The hot-plugging computing modules process data uploaded by downstream devices and are core computing modules in the whole hot-plugging edge computing system 100.

The hardware configurations of the hot-plugging computing modules 130 follow three rules: 1) a certain amount of data processing must be achieved per second, which requires specific frequency and quantity of plug-and-play unit processors, memory or cache capacity, and computing resources; 2) when running at full speed, the operating power consumption must be under a specified maximum power consumption; 3) the costs of the hot-plugging computing modules 130 must meet the budget limitations.

Based on the above three principles, the processor core adopted by each of the hot-plugging computing modules 130 is generally a processor developed based on a reduced instruction set. Optionally, each of the hot-plugging computing modules 130 comprises but is not limited to an ARM processor, a RISC-V processor, or an FPGA.

Considering that the comprehensive energy power station is equipped with numerous devices, the present disclosure is designed with an application layer that can be tailored to specific scenarios with software solutions. Specifically, each of the hot-plugging computing modules 130 comprises a Shell software architecture with its underlying driver separated from its application layer, to realize parallel computing of the hot-plugging computing modules 130.

That is, the Shell architecture is used for the software architecture of each of the hot-plugging computing modules 130, and a program (similar to a drive) needs to be written to support interaction of the computing unit or the processor core with peripheral hardware, networks, PCIe, and memory (through DMA). Application programs (APP) may request the data processing unit to download data from the cloud server 160 or the local elastic database 120 to the application layer of each of the hot-plugging computing modules 130 for execution as required. This distinguishes between general programs and application programs. General programs are reusable and include general system infrastructure and IP, such as memory controllers, PCIe, DMA modules, various I/O interfaces and controllers, etc. Application programs are flexibly configured based on application scenarios. Based on these two points, large-scale parallel computing of the hot-plugging edge computing system 100 is realized with the support of the hot-plugging computing modules 130, and real-time data processing and highly customizable algorithm functions are realized, which greatly improves the processing and operation ability of the system for different business scenarios.

It may be seen from the above that, each active hot-plugging computing module 130 periodically sends information thereof to the data processing unit, comprising configuration, running task status, and the like. When the cloud server 160 assigns a computing task to the data processing unit, the data processing unit first determines all available hot-plugging computing modules 130 according to the task type, and then assigns the task to one or several hot-plugging computing modules 130 according to the status of active hot-plugging computing modules 130, thereby realizing efficient local parallel computing.

It can be seen that the hot-plugging edge computing system 100 bases the design of the edge hot-plugging computing modules 130 on the data processing unit and the local elastic database 120, and realizes parallel local operation, which can be dynamically adjusted based on business requirements and has a large data processing throughput. In addition, the SSD array and the hot-plugging computing modules 130, which serve as main data storage bodies, are two hot-plugging components, whose number/size can be increased or decreased according to actual needs, so as to reduce the cost. The reason for adopting a plurality of hot-plugging computing modules 130 is to reduce the requirement for the main frequency of the processor through parallel computing and to realize computing with a low power consumption.

Optionally, the hot-plugging edge computing system further comprises an interface module 150 connected to the data processing module 110. The interface module 150 has at least two types of communication interfaces and is configured to connect external devices to the data processing module 110.

The communication interface comprises but is not limited to GPIO, RS232, RS485, CAN, USB, SPI, IIC, and the like.

Numerous devices are arranged in the comprehensive energy station, and different devices may provide different hardware communication interfaces to external devices. Therefore, the interface module 150 has a plurality of hardware communication interfaces for downstream devices, such as GPIO, RS232, RS485, CAN, USB, SPI, and IIC. In addition, the interface module 150 is responsible for docking function at various communication protocol levels, and has data packaging capabilities, that is, it packages data obtained from different devices and uploads it to the data processing unit.

In summary, the present disclosure can realize rapid analysis of multi-station cooperation of comprehensive energy stations, and utilize a model-free distributed data processing architecture to flexibly address data calculation and processing requirements across various scenarios; the present disclosure achieves a hot-plugging edge computing system with a low power consumption and a high computing power, enabling on-site edge computing within comprehensive energy power stations. This facilitates the rapid transmission and calculation of energy terminal data, providing a foundation for the efficient management and control of multi-energy networks. Therefore, the present disclosure effectively overcomes various disadvantages in the prior art, and has a high industrial utilization value.

The above embodiments describe the principle and efficacy of the present disclosure by using examples, and are not used to limit the present disclosure. Any person familiar with this technology can modify or change the above embodiments without departing from the spirit and scope of the present disclosure. Therefore, all equivalent modifications or changes made by a person skilled in the art without departing from the spirit and technical ideas disclosed in the present disclosure shall still be covered by the claims of the present disclosure.

What is claimed is:

1. A hot-plugging edge computing system, comprising:
   at least an elastic database, a data processing module, an interface module, and hot-plugging computing modules,
   wherein the elastic database comprises a solid-state drive (SSD) array with a configurable number of SSDs to store data with a configurable capacity;
   wherein the data processing module comprises a connecting port to connect to the elastic database and multiple connecting ports to the hot-plugging computing modules, wherein the data processing module controls data storage in the elastic database, and monitors and assigns a task to each of the hot-plugging computing modules; wherein after receiving a computing task, the data processing unit first requests a corresponding task-algorithm-module support list from the elastic database based on the application scenario and the computing task indicated by a task identification code, selects a compatible hot-plugging computing module from the support list based on Platform-Resource grade attributes displayed in the list, and determines, based on status information uploaded by the hot-plugging computing module, whether to deliver an algorithm module to the hot-plugging computing module; and
   wherein each of the hot-plugging computing modules performs data computing based on a corresponding task assigned by the data processing module, and returns a computing result to the data processing module;
   wherein the interface module is connected to the data processing module, wherein the interface module comprises at least two types of communication interfaces, and wherein the at least two types of communication interfaces connect external devices to the data processing module.

2. The hot-plugging edge computing system as in claim 1, further comprising a switch connected between the data processing module and the hot-plugging computing modules, wherein the switch comprises a plurality of access ports connected to the hot-plugging computing modules.

3. The hot-plugging edge computing system as in claim 1, wherein the data processing module comprises:
   a monitoring unit comprising a connecting port to periodically receive status information from the hot-plugging computing modules via the connection port; and
   a task assignment unit, comprising a connecting port to connect to the monitoring unit, wherein the task assignment unit assigns a task to one of the hot-plugging computing modules via the connecting port based on the status information and task data attributes of the hot-plugging computing module.

4. The hot-plugging edge computing system as in claim 3, wherein the task data attributes comprise a task type, a task data type, and/or a data processing throughput.

5. The hot-plugging edge computing system as in claim 3, wherein the data processing module further comprises:
   a data transmission unit, comprising an algorithm unit or a demand solving unit, and connection ports to connect to each of the hot-plugging computing modules; wherein the data transmission unit is requested by one of the hot-plugging computing modules to perform data computing, and then the data transmission unit transmits the computed data from the algorithm unit or the demand solving unit to the hot-plugging computing module based on the task data attributes.

6. The hot-plugging edge computing system as in claim 3, wherein the data processing module further comprises:

a data acquisition and processing unit, comprising a connection port to receive acquired data from a data collection terminal, wherein the data acquisition and processing unit encrypts and stores the received data into the elastic database; and a data uploading unit, comprising connection ports to connect to each of the hot-plugging computing modules, wherein the data uploading unit stores the computing result returned by each of the hot-plugging computing modules into the elastic database or upload the computing result to a cloud server.

7. The hot-plugging edge computing system as in claim 1, wherein each of the hot-plugging computing modules comprises an ARM processor, a RISC-V processor, or an FPGA, and the data processing module comprises a data processing unit.

8. The hot-plugging edge computing system as in claim 1, wherein each of the hot-plugging computing modules comprises a Shell software architecture with its underlying driver separated from its application layer, to realize parallel computing of the hot-plugging computing modules.

9. The hot-plugging edge computing system as in claim 1, wherein the hot-plugging computing modules have differentiated configurations.

\* \* \* \* \*